No. 612,918. Patented Oct. 25, 1898.
W. J. S. STRANGE.
BICYCLE DRIVING MECHANISM.
(Application filed Nov. 20, 1897.)
(No Model.)
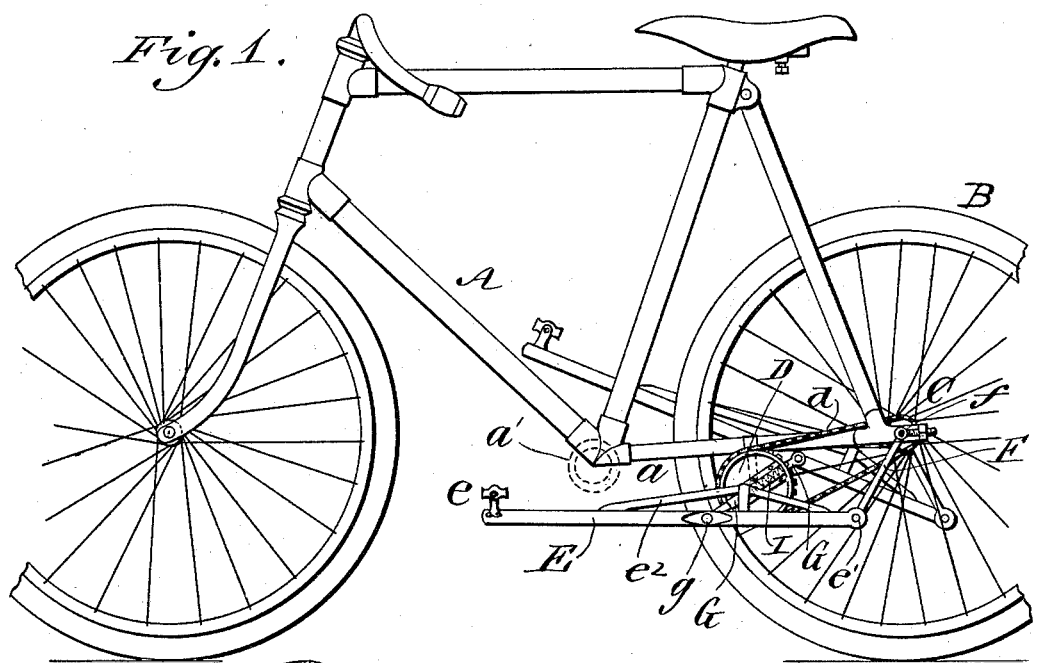
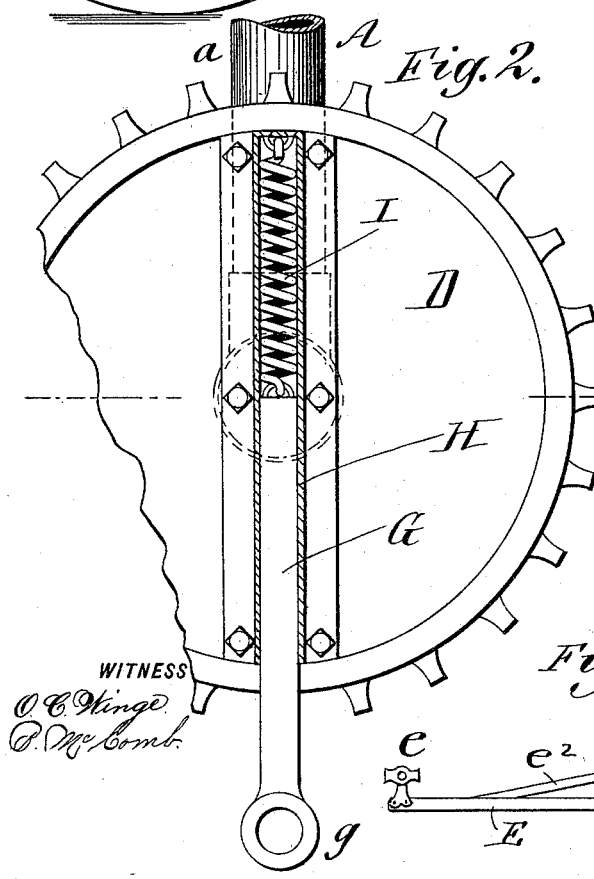
WITNESS
O. C. Winge
P. McComb
INVENTOR
G. W. J. S. Strange
BY
Barry Deemer Co.
ATTORNEYS

UNITED STATES PATENT OFFICE.

WILLIAM JAMES STEVENSON STRANGE, OF LEAMINGTON, ENGLAND.

BICYCLE DRIVING MECHANISM.

SPECIFICATION forming part of Letters Patent No. 612,918, dated October 25, 1898.

Application filed November 20, 1897. Serial No. 659,227. (No model.)

*To all whom it may concern:*

Be it known that I, WILLIAM JAMES STEVENSON STRANGE, a subject of the Queen of Great Britain, and a resident of Dormer Lodge, Leamington, county of Warwick, England, have invented certain new and useful Improvements in Bicycle Driving Mechanism, of which the following is a specification, reference being had to the accompanying drawings, forming a part thereof, in which similar letters of reference indicate corresponding parts.

This invention relates to that class of bicycle driving mechanism which is designed to enable a direct pedal movement in a vertical or elliptical plane in lieu of the rotary pedal movement which is necessary when the pedal is directly connected to the crank.

The object of my invention is to provide a simple and improved mechanism of this character in which a long downstroke and short upstroke will be insured, whereby economy in power and the comfort, convenience, and grace of the rider will be enhanced.

In the drawings, Figure 1 is a side elevation of a bicycle embodying my improvements. Fig. 2 is a detail side view of the main chain-wheel, my improved crank mechanism being shown in section. Fig. 3 is a detail transverse sectional view taken on the line 3 3, Fig. 2; and Fig. 4 is a detailed modification.

Referring to the drawings, A designates the frame of the machine, which may be in the main of any ordinary or adapted construction. B is the driving-wheel. C is the hub sprocket or chain wheel, and D is the main sprocket or chain wheel. The latter is preferably arranged a suitable distance in front of and below the hub-sprocket and with due relation to the projecting position of the operating foot-lever and has its bearings in the lower portion *a* of the frame. I prefer to provide a double ball-bearing for the main sprocket-wheel, as shown in Fig. 3. The sprockets C and D are connected in the usual manner by sprocket-chain *d*.

E designates a foot-lever which projects at the side of and with relation to the main sprocket D. This foot-lever is provided at its free front end with a pedal *e*, of any suitable construction, and has its rear end pivotally connected, as at *e'*, with the lower end of a link F, which projects upwardly and has a pivotal bearing, as at *f*, in the rear lower portion of the frame, this connection or bearing being preferably at a point on a plane with the axle or shaft of the driving-wheel B and hub-sprocket C. Intermediately at a suitable point between its pivoted and link-suspended end and free front or pedal end the lever E is pivotally connected, as at *g*, to the end of a crank-rod G, which is housed and adapted to slide within a corresponding tube or casing H, which is transversely secured to the main sprocket-wheel D. The outer end of the crank-rod G projects from its casing H and extends radially beyond the periphery of the sprocket-wheel, while its inner end is connected with a coiled spring I, housed within the inner end portion of the casing H and having its ends respectively connected to the casing and to the sliding crank-rod. It will be understood that duplex driving mechanism such as that above described is provided at both sides of the driving-wheel B.

The operation and advantages of my invention will be readily understood.

The main sprocket-wheel D is rotated by the action of the crank-rod G, which in turn is operated by the foot-lever E. The path followed by the front or pedal end of the foot-lever in the operation of the driving mechanism is elliptical and in a vertical plane, thus affording a more direct application of power. The upward movement of the foot-lever is reduced by the action of the spring-eye, which operates to draw the crank-rod G within its casing H as soon as pressure upon the foot-lever is released. The crank-rod is thus always in short position on the upstroke; but on the downstroke it will be carried outwardly from the casing H against the tension of its governing spring-eye and thus increase the length of the stroke.

It will be understood that my improved spring-governed extensible crank connection between the main sprocket-wheel and the vertically-operating foot-lever insures a long downstroke and a short upstroke, the crank-rod having a sliding movement both outwardly from and inwardly toward the axis of the sprocket-wheel during the rotation of the latter.

If desired, the foot-lever E may be trussed, as shown at $e^2$, to insure greater strength, and in practice a ball-bearing box $e^3$ should be formed thereon for engagement with a projected pin of the crank G, as shown by Fig. 4 of the drawings.

I do not confine myself to the specific details of mechanical construction and relative arrangements of parts as illustrated in the drawings, as it is obvious that under the scope of my invention I am entitled to slight variations. For instance, the shaft carrying the driving-sprockets might be journaled through a box formed at the intersection of the lower tubular portions of the frame, as shown by dotted lines at $a'$, the usual ball-bearings being employed.

Having thus described my invention, what I claim as new, and desire to secure by Letters Patent, is—

1. An improved bicycle driving mechanism, comprising, in combination with the main sprocket-wheel, a foot-lever pivotally suspended upon links at its rear end, and an extensible crank connection between the foot-lever and the sprocket-wheel, said crank connection having a variable position by which the distance between the pivotal crank connection of the foot-lever and the axis of the sprocket-wheel is lengthened on the downstroke and shortened on the upstroke, substantially as and for the purpose set forth.

2. An improved bicycle driving mechanism, comprising, in combination with the main sprocket-wheel, a foot-lever pivotally suspended upon links at its rear end, a sliding crank-rod connected with the sprocket-wheel and pivotally connected with the foot-lever, said crank-rod being adapted to move to and from the axis of the sprocket-wheel, and a coiled spring connected with and governing the position of the crank-rod, substantially as and for the purpose set forth.

3. An improved bicycle driving mechanism, comprising, in combination with the sprocket-wheel, a foot-lever pivotally suspended upon links at its rear end, a crank-rod sliding in a casing transversely carried by the sprocket-wheel and pivotally connected at its outer end to the foot-lever, and a coiled spring connected with the inner end of said crank-rod and governing the position of the same, substantially as and for the purpose set forth.

In testimony that I claim the foregoing as my invention I have signed my name, in presence of two witnesses, this 2d day of November, 1897.

WILLIAM JAMES STEVENSON STRANGE.

Witnesses:
WILLIAM CHARLES HANNAY,
CHARLES NOWELL.